(12) United States Patent
Aruga

(10) Patent No.: US 6,976,116 B2
(45) Date of Patent: Dec. 13, 2005

(54) DISK SUBSYSTEM

(75) Inventor: Kazuhisa Aruga, Odawara (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 10/337,397

(22) Filed: Jan. 7, 2003

(65) Prior Publication Data

US 2003/0097525 A1 May 22, 2003

Related U.S. Application Data

(63) Continuation of application No. 09/495,868, filed on Feb. 2, 2000, now Pat. No. 6,542,954.

(30) Foreign Application Priority Data

Feb. 2, 1999 (JP) .......................... 11-024648

(51) Int. Cl.[7] .............................. G06F 13/16
(52) U.S. Cl. ................. 710/316; 710/38; 711/112
(58) Field of Search ............... 710/11, 38, 62, 710/65, 74, 315, 316; 711/111, 112, 114; 714/5, 6, 7

(56) References Cited

U.S. PATENT DOCUMENTS

| | | | |
|---|---|---|---|
| 4,144,583 A | 3/1979 | Lawson et al. ............. 711/112 |
| 5,077,736 A | 12/1991 | Dunphy, Jr. et al. ............ 714/7 |
| 5,274,645 A | 12/1993 | Idleman et al. ................ 714/6 |
| 5,471,586 A | 11/1995 | Sefidvash et al. ........... 710/104 |
| 5,611,056 A | * | 3/1997 | Hotchkin .................... 710/306 |
| 5,699,533 A | 12/1997 | Sakai ......................... 710/316 |
| 5,729,763 A | 3/1998 | Leshem ....................... 710/38 |
| 5,752,256 A | * | 5/1998 | Fujii et al. ................... 711/114 |
| 5,768,551 A | 6/1998 | Bleiweiss et al. ........... 710/316 |
| 5,812,754 A | * | 9/1998 | Lui et al. ....................... 714/6 |
| 5,841,997 A | * | 11/1998 | Bleiweiss et al. ........... 710/317 |
| 5,867,640 A | 2/1999 | Aguilar et al. ................. 714/6 |
| 5,941,972 A | 8/1999 | Hoese et al. ................ 710/315 |
| 6,006,342 A | 12/1999 | Beardsley et al. ............. 714/5 |
| 6,023,754 A | 2/2000 | DuLac et al. ................. 712/33 |
| 6,041,381 A | 3/2000 | Hoese ........................ 710/315 |
| 6,061,750 A | 5/2000 | Beardsley et al. ............ 710/74 |
| 6,148,414 A | 11/2000 | Brown et al. ................... 714/8 |
| 6,185,203 B1 | 2/2001 | Berman ...................... 370/351 |
| 6,195,703 B1 | 2/2001 | Blumenau et al. .......... 709/238 |
| 6,247,077 B1 | 6/2001 | Muller et al. ................. 710/74 |
| 6,324,181 B1 | 11/2001 | Wong et al. ................. 370/403 |
| 6,356,984 B1 | * | 3/2002 | Day et al. ................... 711/147 |
| 6,401,128 B1 | 6/2002 | Stai et al. ................... 709/236 |
| 6,421,753 B1 | 7/2002 | Hoese et al. ................ 710/305 |
| 6,425,035 B2 | 7/2002 | Hoese et al. ................ 710/105 |
| 6,425,036 B2 | 7/2002 | Hoese et al. .................. 710/62 |
| 6,446,141 B1 | 9/2002 | Nolan et al. ................... 710/8 |
| 6,493,347 B2 | 12/2002 | Sindhu et al. ............... 370/401 |
| 6,574,667 B1 | 6/2003 | Blumenau et al. .......... 709/229 |

FOREIGN PATENT DOCUMENTS

| | | | | |
|---|---|---|---|---|
| JP | 04165526 A | * | 6/1992 | ............ G06F/3/06 |
| JP | 10171746 | | 6/1998 | |

* cited by examiner

*Primary Examiner*—Gary Portka
(74) *Attorney, Agent, or Firm*—Mattingly Stanger Malur & Brundidge, P.C.

(57) ABSTRACT

A protocol controller disposed between switches in a fiber channel fabric switch circuit and disk drive units for converting a protocol to enable one-to-one connectivity established between controllers and disk drive units.

18 Claims, 7 Drawing Sheets

DISK SUBSYSTEM

The present application is a continuation of application Ser. No. 09/495,868, filed Feb. 2, 2000, now U.S. Pat. No. 6,542,954, the contents of which are incorporated herein by reference.

BACKGROUND OF THE INVENTION

1. Field of the Invention

The present invention relates to an electronic device including a computer system incorporating a disk subsystem, a disk array, or a disk drive. The present invention also relates to a technology, which allows high-speed transfer by means of arrayed disks connected by a fabric switch.

2. Description of the Prior Art

In general, the connection between a disc controller device and a plurality of disk drives in a disk array may be achieved, as disclosed in the JP-A No. 10-171746, by an SCSI interface or by a fibre channel arbitrated loop topology.

The SCSI interface, which uses a time-divided data transfer method on one signal line, negotiates with its initiator one to one for one moment on one signal line for an access.

The fibre channel arbitrated loop topology, on the other hand, may connect the initiator and disk drives in a loop by means of a serial interface, to enable time-division transfer of the data divided into frames to allow a number of communications with a plurality of devices at the same time and to allow up to 126 disk drive devices to be connected.

Disk drives will become more and more compact and higher density implementation thus will ultimately realize the use of more disk drive devices. Ideally the connection of a disk drive with its interface one to one should be implemented to enable a maximum transfer rate.

An SCSI interface in the Prior Art adopts a one-to-one data transfer scheme for one moment in one signal line. This may be a drawback if one wishes to implement simultaneous communications between an initiator and a plurality of disk drives. The number of connectable disk drive units in one bus is also limited to 7 or 15. When one connects a number of drive units for one-to-one negotiation on the SCSI interface, a plurality of interfaces are required, causing difficulty in mounting. Because the number of the connectable disk drive units in one controller is so limited, one may encounter the necessity to add some further controller interfaces for connecting all units to a system.

When using a fibre channel, a plurality of disk drive units may be connected to a single controller. In a case where the controller and disk drive units may be connected by implementing a fibre channel fabric switch for switching the connectivity, a substantial one-to-one connection between the controller and the disk drive units may be implemented. Although the controller may support a fabric protocol for switching connection, generic disk drive units support only a fibre channel arbitrated loop (FC-AL) protocol but not the fabric protocol.

This resulted in that the switching connection may not be implemented, so that a loop connection had to be used with the FC-AL for sharing a same loop between plural disk drive units.

More specifically, a device (a controlling device in this context) which supports the fabric protocol has a World Wide Name (WWN), as its unique 24-bit address. The device may be logged in to the fibre channel fabric switch by using this unique address. A device (a disk drive unit) which supports only the FC-AL protocol but not the fabric protocol uses significant 16 bits in a same 24 bit address for verifying location within the loop and least 8 bits for the address AL-PA (Arbitrated Loop Port Address: each disk unit have a unique value in the loop) for logging in to a device (a controlling device managing the loop).

In such a loop connection, if the number of disk drive units connected in the same loop is increased, a data transfer rate of disk drive units may ultimately exceed beyond a maximum data transfer rate of the loop, resulting in that the data transfer in this loop may be limited to efficiency of the maximum data transfer rate of the loop. The data transfer rate in such a loop will be decreased to that in an equivalent SCSI interface.

SUMMARY OF THE INVENTION

The present invention has been made in view of the above circumstances and has an object to overcome the above problems and to provide a switch connection having a protocol converter for converting a protocol used between a disk drive unit and a controlling device to allow the disk drive unit and the controlling device to be connected one to one in a switching connection. For a switch having such a protocol converter, such as an FL_Port in accordance with an ANSI standard.

Additional objects and advantages of the invention will be according to part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The following description of a preferred embodiment of the present invention may be best understood by reading carefully with reference to the accompanying drawings, in which.

DETAILED DESCRIPTION OF THE PREFERRED EMBODIMENTS

Figure 1:
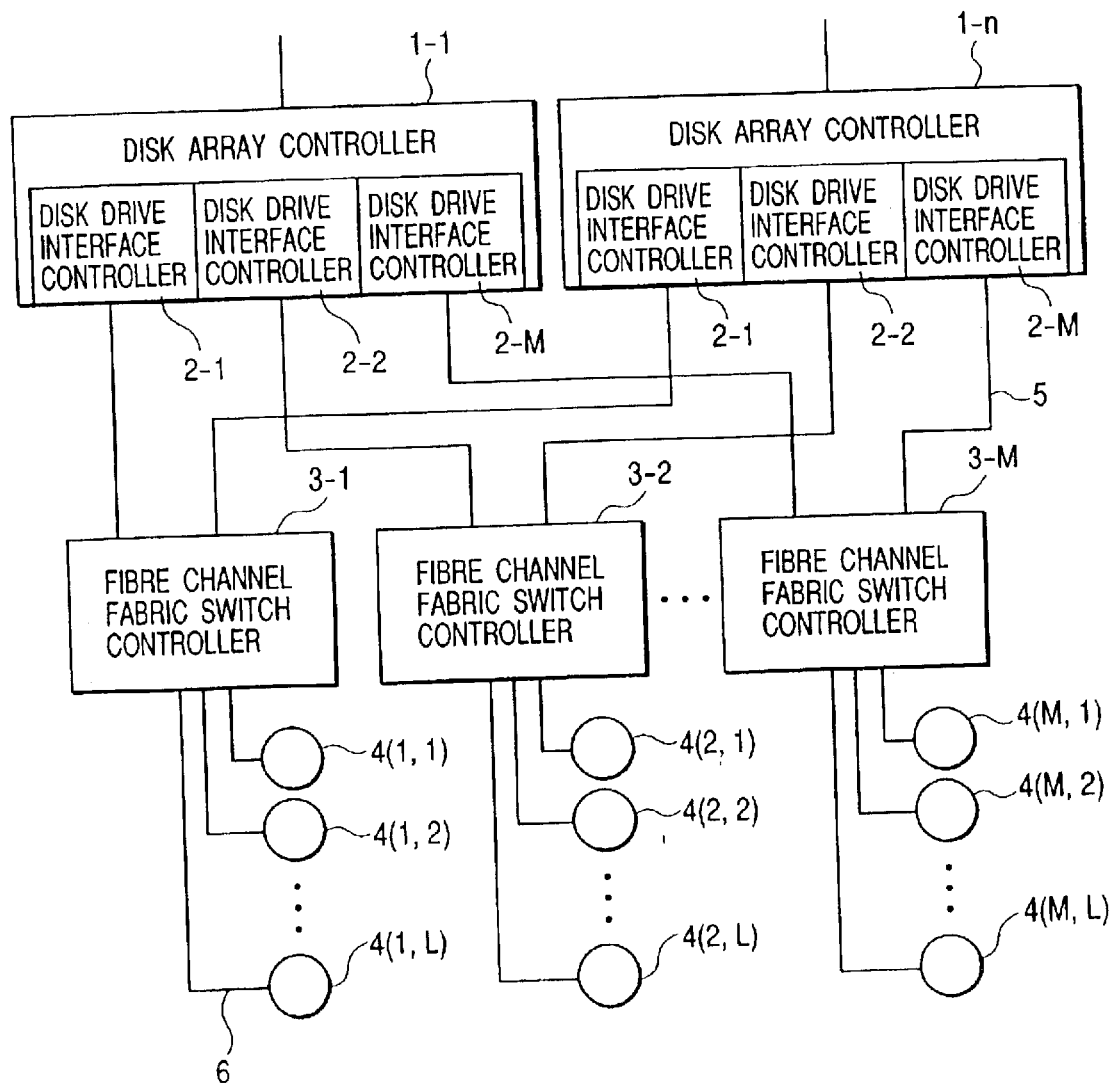
FIG. 1 is an overview of a preferred embodiment in accordance with the present invention.

A detailed description of a preferred embodiment of an external storage device (a disk subsystem) embodying the present invention will now be given referring to the accompanying drawings. FIG. 1 shows an overview of the device.

In the external storage device shown in the figure, N disk array controllers (controller section) 1-1 to 1-N (controllers in middle such as 1-2 are not shown, this applies to hereinbelow) are connected to a host computer (not shown) in an upper side, and provide M disk drive interface (disk drive I/F) controllers 2-1 to 2-M in a bottom side. The hardware configuration of the disk array controller will be described below in greater details. Each of M controllers of fibre channel fabric switch 3-1 to 3-M are respectively connected to the disk drive interface (I/F) controllers 2-1 to 2-M for controlling disk drive units through their fibre channel interface 5. L disk drive units are connected to one fibre channel fabric switch controller, a total of M by L disk drive units (4(1,1) to 4(M,L)) are connected to the fibre channel fabric switch controllers 3-1 to 3-M through fibre channel interfaces 6.

Each of disk drive interface controllers 2-1 to 2-M and disk drive units 4(1,1) to 4(M,L) has its unique identifier (ID number) for a loop protocol respectively. The fibre channel fabric switch controllers 3-1 to 3-M receive the ID numbers of the disk drive units to be connected from the disk drive interface controllers 2-1 to 2-M, to establish one-to-one connection between the corresponding disk drive interface controllers 2-1 to 2-M and the disk drive units 4(1,1) to 4(M,L).

Figure 2:
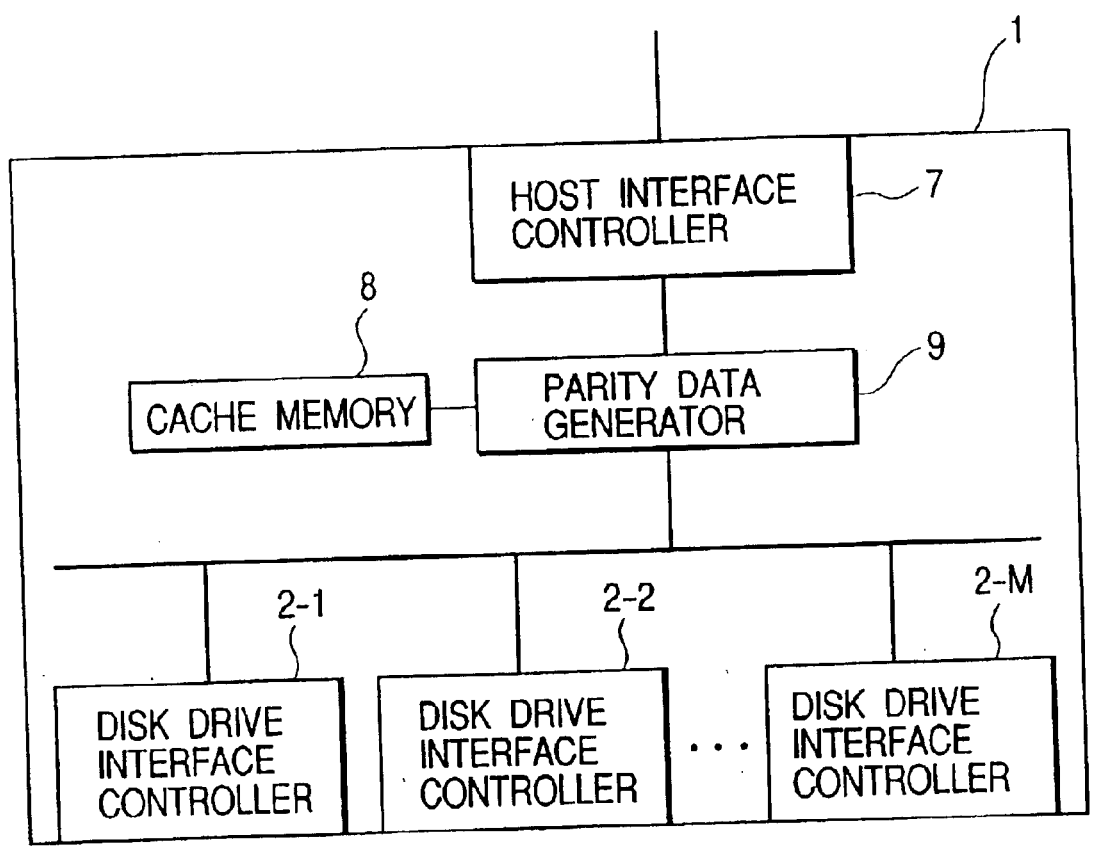
FIG. 2 is a schematic detailed block diagram of a disk array controller.

FIG. 2 shows a hardware configuration of the disk array controllers 1-1 to 1-N. Data transferred thereto from the host computer (not shown) is temporarily stored in a cache memory controlled by a host interface controller 7 so as to be added with parity data by a parity data generator 9, then to be split into (a total of M segments of) data blocks and parity data block(s). These data blocks and parity block(s) will be stored to a respective disk drive group (not shown) by the disk drive interface controllers 2-1 to 2-M, which are corresponding interfaces.

To transfer data to the host computer (not shown), if there is data to be transferred thereto in the cache memory 8, then the data in the cache will be transferred to the host by the host interface controller 7. If the data to be transferred to the host is not in the cache memory 8 then the disk drive interface controllers 2-1 to 2-M will read split data segments out of the disk drive group, concatenate split data segment blocks in the parity data generator 9, and store the complete data temporarily in the cache memory 8, and the host interface controller 7 will transfer the data to the host.

The foregoing embodiment depicts a data storage method in a case of a RAID system. However data may also be stored without the RAID system. Without the RAID system, parity data generator 9 does not exist. The data transferred from the host (not shown) are temporarily stored in the cache memory 8 and then written to any one of disk drive units in the disk drive group. When mirroring a same data will be written into the plural disk drive units. For reading out, the data will be read out of the disk drive units, stored temporarily in the cache memory 8 and the host interface controller 7 will transfer to the host.

It should be noted that in the following description, another embodiment of disk subsystem using the RAID system will be described, however the embodiment may equivalently be made without using the RAID system.

Figure 3:
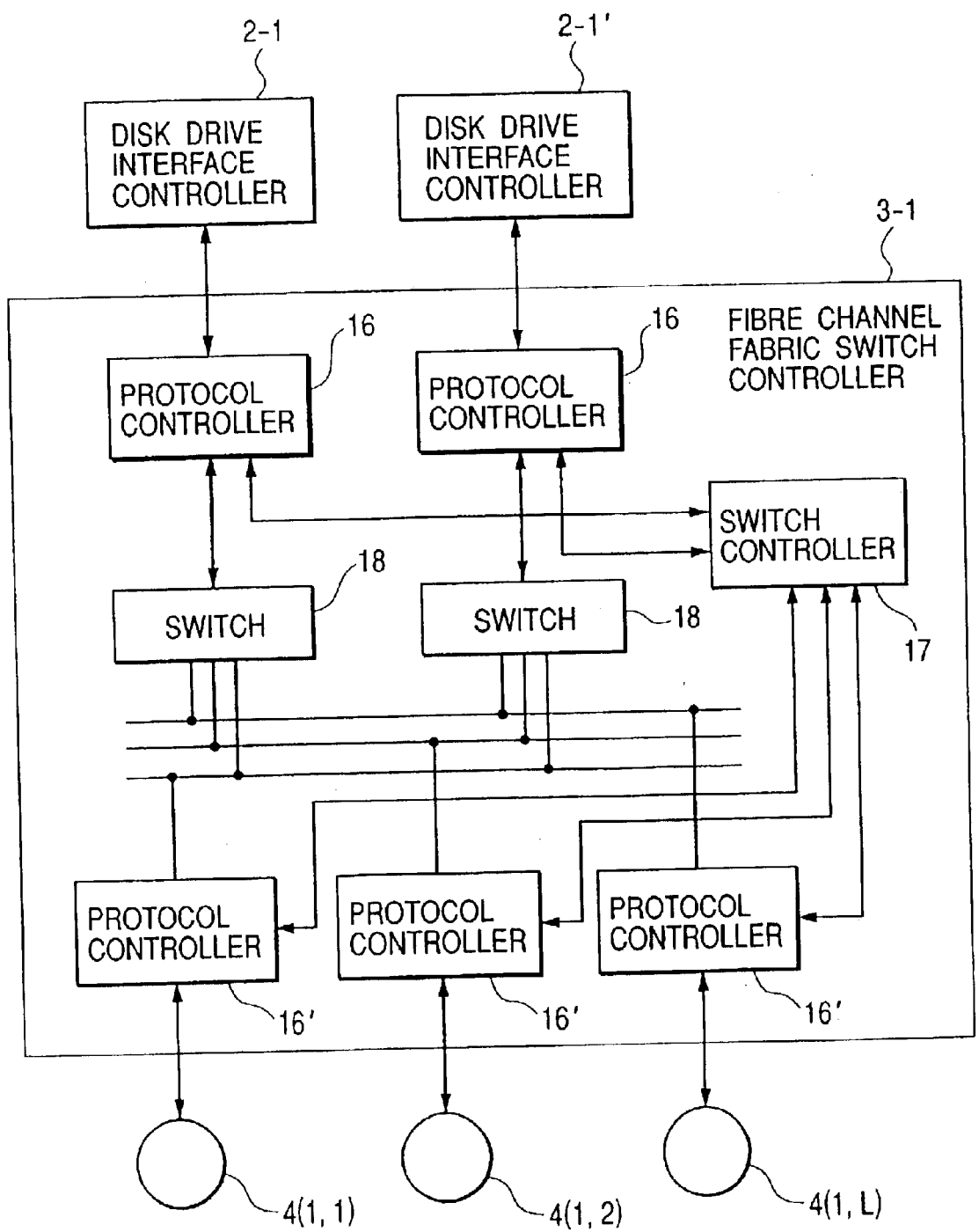
FIG. 3 is a schematic detailed block diagram of a fibre channel fabric switch controller.

FIG. 3 shows a hardware configuration of the fibre channel fabric switch controllers 3-1 to 3-M. A protocol controller 16 (a first protocol controller) connected to the disk drive interface controller 2-1 detects ID number of the disk drive units 4(1,1) to 4(1,L) to be accessed and controls a fibre channel protocol used. A protocol controller 16' (a second protocol controller) connected to the disk drive units 4(1,1) to 4(1,L) allocates a new ID number for a fabric protocol of the disk drive units 4(1,1) to 4(1,L) to the ID number for the loop protocol specific to the disk drive units 4, in order to report to a switch controller 17 the ID number of disk drive units 4(1,1) to 4(1,L) in charge. The switch controller 17, which maintains the ID numbers for these protocols of the disk drive units 4(1,1) to 4(1,L) by using for example a table, may set the switch 18 based on the ID number (fabric protocol) received from the disk drive interface controllers 2-1 to 2-M so as to establish the one-to-one connection.

In other words the switch controller 17 sets the corresponding 24-bit WWN address used in the fabric protocol to each of disk drive units 4 as a new ID number. Then the switch controller 17 may use a table to attempt to correspond the ID number for the loop protocol with the newly set ID number for the loop protocol. By corresponding the ID5 the disk drive interface controller may establish a connection to the disk drive unit 4 by using the newly set ID number. In this specification this coordination of ID numbers may also be referred to as a protocol control or a protocol conversion.

In addition, the protocol control may be set so as to be performed in the protocol controller 16', or may be set so as to switch the protocol controller 16 with the protocol controller 16' for the data transfer from the host computer and for the data transfer to the host, or for the data transfer for a normal operation and for the data transfer for an operation in a disk failure.

Another configuration may also be used in which one of the protocol controller 16 and the protocol controller 16' is used, in such a case an ID number detector means may be provided instead of the protocol controller 16, or an ID number allocating means may be provided instead of the protocol controller 16'.

Alternatively, a protocol controller and switches may be provided within the disk drive interface controllers 2-1 to 2-M to allow direct connection to the disk drive units 4(1,1) to 4(1,L), instead of proprietary fibre channel fabric switches provided independently in the system.

Figure 4:
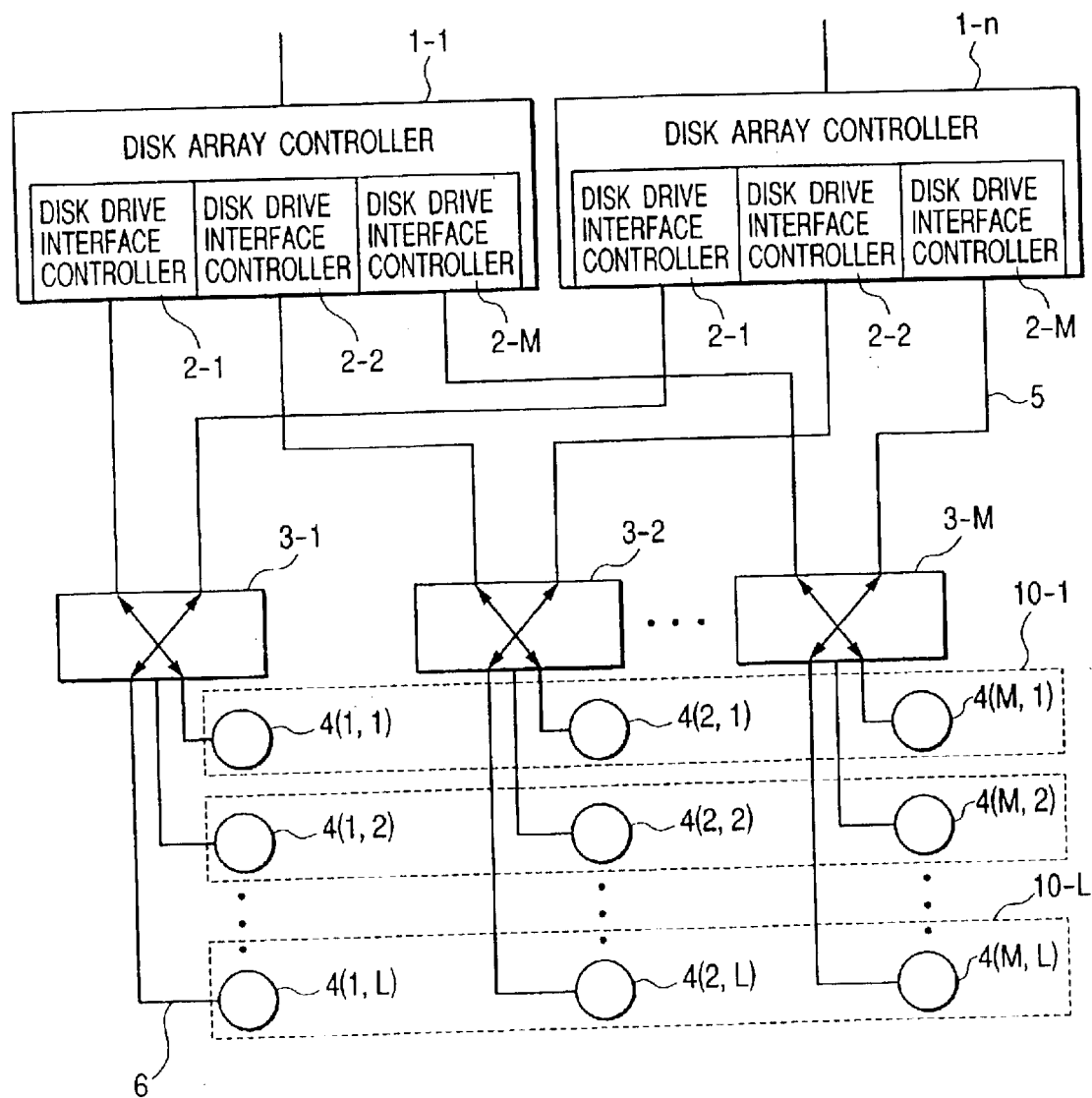
FIG. 4 is a schematic block diagram of a fibre channel fabric switch.

FIG. 4 shows an operation of the fibre channel fabric switch controllers 3-1 to 3-M.

The disk array controller 1-1 stores data split to M segments into a disk drive group 10-1. The disk drive interface controllers 2-1 to 2-M in the disk array controller 1-1 send the ID number of disk drive units belonging to the disk drive group 10-1 to the fibre channel fabric switch controllers 3-1 to 3-M so as to establish a switching. The protocol controller 16 in the fibre channel fabric switch controllers 3-1 to 3-M (see FIG. 3) detects the ID number sent to request the switch controller 17 to switch the switch connection in order to achieve the protocol control pertinent to the disk drive units. The switch controller 17 (see FIG. 3) switches a switch 18 (see FIG. 3) so as to connect the disk array controller 1-1 requesting connection to the requested disk drive unit 4 belonging to the disk drive group 10-1.

It should be recognized that since the disk array controller 1-1 is correspondingly connected to one disk drive group 10-1 through the fibre channel fabric switch controllers 3-1 to 3-M another disk array controller 1-N and the disk drive group 10-2 may separately perform another data transfer without interference. When the disk array controller 1-N establishes a connection to the disk drive group 10-L, the connection between the disk array controller 1-1 and the disk drive group 10-1 and the connection between the disk array controller 1-N and the disk drive group 10-L can operate separately from each other to perform the data transfer at a maximum data transfer rate possible between each disk array controller and respective disk drive unit.

Although not described in this specification the switch controller 17, when switching the connection as have been described above, may effectively maintain the maximum transfer window by switching the connection of the switch 18 upon reception of signals indicating that the disk drive unit connected thereto becomes ready to read/write at a time of data read or data write.

Figure 5:
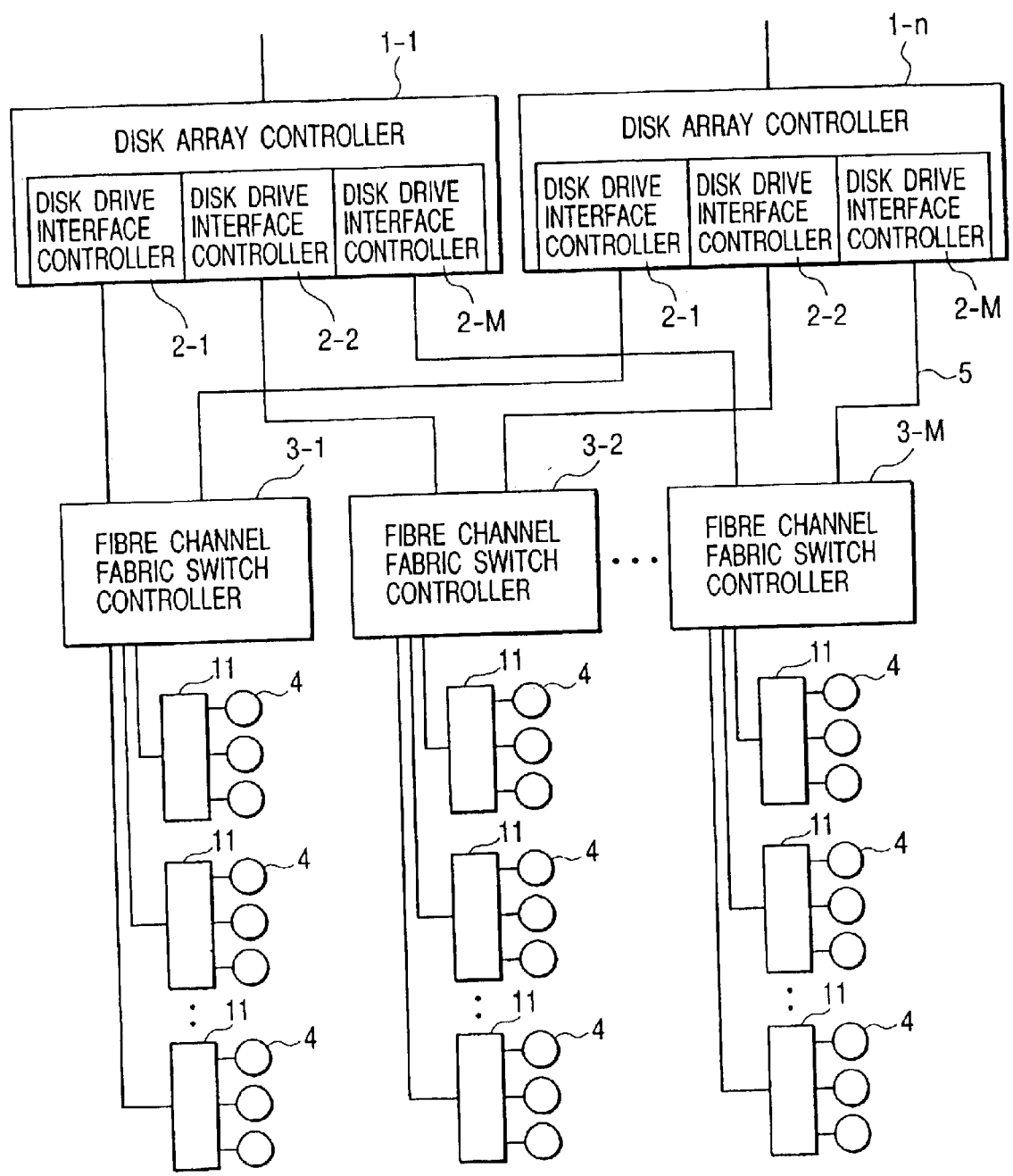
FIG. 5 is a schematic block diagram of a fibre channel fabric switch and an arbitrated loop.

FIG. 5 shows another extended embodiment in accordance with the present invention. In the embodiments above, the protocol controller 16 in a fibre channel fabric switch controller 3 was connected one to one to the disk drive unit 4. In the present embodiment however, a same section is configured such that the protocol controller 16 is connected in loop to the plural disk drive units 4 through a fibre channel arbitrated loop controller 11. In this manner, an array of a plurality of inexpensive disk drive units 4 may operate at the performance level equivalent to an expensive large disk drive unit of the same capacity. In this configuration not all disk drive units are connected in loop. Apparently the fibre channel arbitrated loop controller 11 and the plural disk drive units 4 form the single disk drive unit 4. The performance of accessing will not be degraded.

Although not shown in the figure, if the maximum data transfer rate of the fibre channel interface is enough higher with respect to the accessing speed of disk drive, the number of disk drive units 4 may be increased without aggravation of access performance, by connecting the plural disk drive units 4 to the fibre channel arbitrated loop controller 11, by connecting the plural disk drive units in a same loop, and by sharing the maximum transfer rate of the fibre channel with the plural disk drive units 4.

Figure 6:
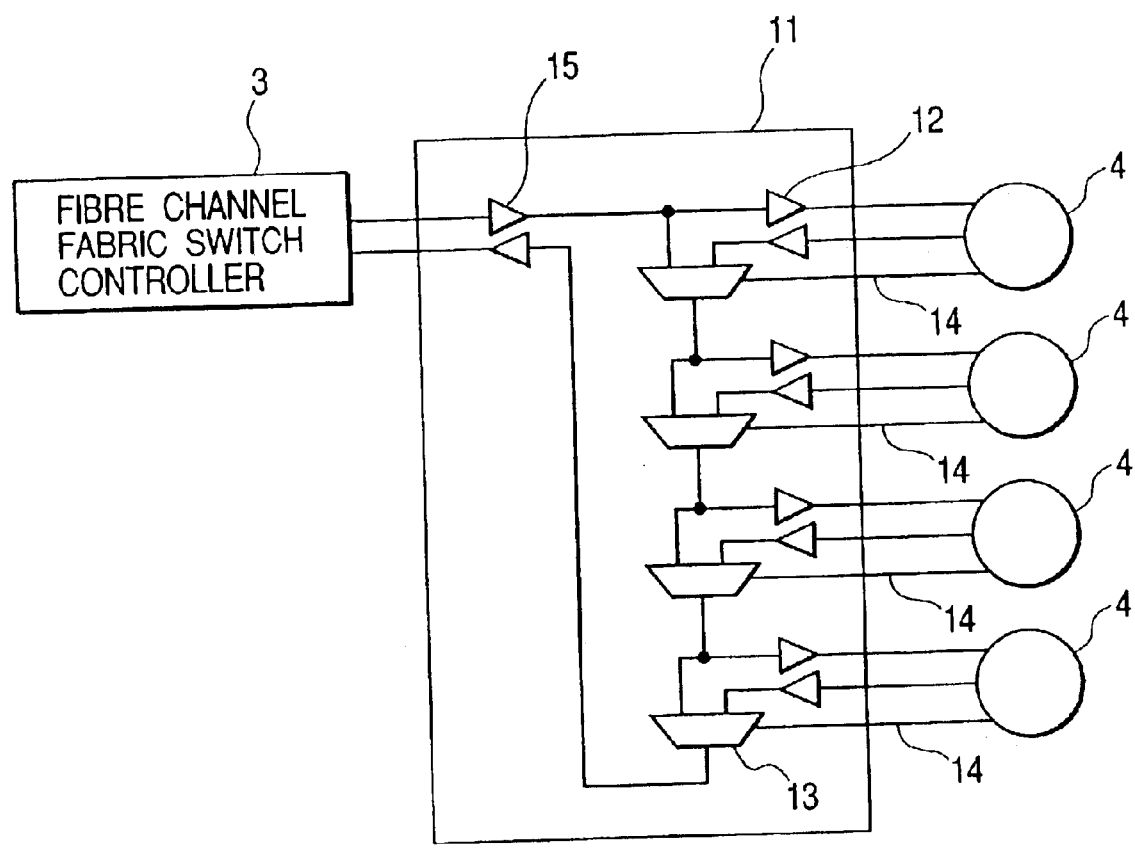
FIG. 6 is a schematic detailed block diagram of a fibre channel arbitrated loop controller.

FIG. 6 shows a hardware configuration of the fibre channel arbitrated loop controller 11 used for the embodiment shown in FIG. 5.

A fibre channel arbitrated loop controller 11 comprises a loop bypass circuit 13, a plurality of disk drive unit attaching ports 12, and a fabric switch connector port 15. From disk drive units 4 loop bypass circuit switching signal 14 is output, allowing ports to be bypassed in case of failure, in order to enable hot swapping of disks. More specifically, loops will keep alive, other operating disks will not be affected, and the failed disk drive unit can be detached and/or new disk drive units can be added.

Figure 7:
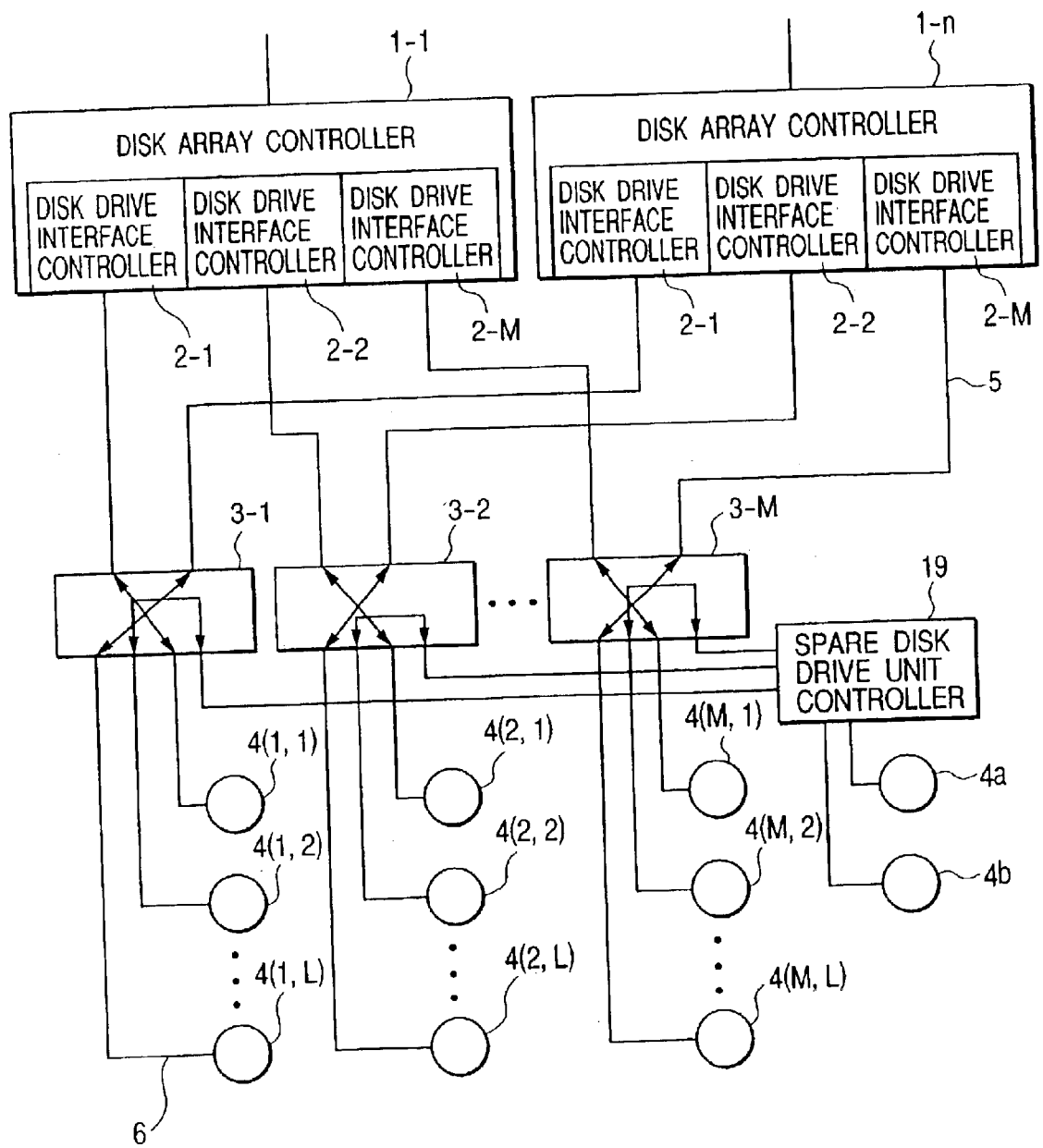
FIG. 7 is a schematic detailed block diagram of a spare disk drive unit controller.

FIG. 7 shows another extended embodiment in accordance with the present invention.

The present embodiment comprises spare disk drive unit controllers 19 each connected to respective fibre channel fabric switch controllers 3-1 to 3-M, a plurality of spare disk drive units 4-*a* and 4-*b* each connected to the spare disk drive unit controllers 19. The spare disk drive units 4-*a* and 4-*b* are provided in common to all (disk drive units connected to) switch controller circuits. These spare disk drive units 4-*a* and 4-*b* may be either connected in loop to a spare disk drive unit controllers 19, or switched.

Within the fibre channel fabric switch controller 3, the protocol controller 16' (see FIG. 3) connected to a disk drive group having a failed disk drive unit 4 (in the figure the disk drive unit 4(1,2)) may be connected to the spare disk drive unit controllers 19 through the switch controller 3-1.

If a disk drive unit is not operating well, the disk array controller 1-1 to **1-*n* attempts to rebuild the data structure in the spare disk drive unit 4**-*a* or 4-*b*. When a specific disk drive unit 4 has so many operational errors that a failure of disk drive unit mechanism is forecasted, the array controller 1-1 picks up and copies data stored in the malfunctioning disk drive unit 4 to a spare disk drive unit 4-*a* or 4-*b* and rebuilds the disk array.

The switch controller of the present embodiment then has an internal configuration or layout of a switch 18' slightly different from the switch controllers as described in the preceding embodiments so as to enable input from the disk drive units to be output to the disk drive units 4. For example, another switch 18' may be provided between the protocol controller 16' and the switch 18 to determine according to the request from the spare disk drive unit controller 18 whether the output from the disk drive units is routed to the switch 18 or routed to another protocol controller 16'.

If a disk drive unit fails and the data stored therein cannot be read out, lost data may be reconstructed in the cache memory 8 and parity data generator 9 in the disk array controller 1 from the data stored in the other disk drive units of the same disk drive group as the failed disk drive unit 4 to rebuild the data into the spare disk drive unit 4-*a* or 4-*b*.

It should be noted that the switch controller 3 identical to the preceding embodiments may be used because the disk array controller 1 may be served for the data recovery when the data stored in an erroneous disk drive unit 4 is copied to a spare disk drive unit.

In addition, the spare disk drive unit controllers 19 may be independently served for the data recovery from a failed disk drive unit. To do this, cache memory and parity data generator should be provided in the spare disk drive unit controllers. 19. The spare disk drive unit controllers 19 may read out data from the disk drive units other than the failed unit in the same group to regenerate the lost data segments and store thus generated data in a spare disk drive unit 4-*a* or 4-*b*.

The data recovery without affecting to the data access operation from the host computer may be achieved by performing access operation to the spare disk drive unit controllers 19 from the failed disk drive unit 4 or from other disk drive units storing split data including the parity for the recovery of errors, independently of the data access operation between the disk drive units 4 (disk drive group comprising disk drive units 4(1,1) to 4(1,L) in the figure) and the host computer via the disk array controllers 1-1 to 1-N.

In a similar manner, when a failed disk drive unit has been hot-swapped with a disk drive unit off the shelf, the recovery of failed unit may be achieved without affecting any access from the host, as the spare disk drive unit controller 15 may establish one-to-one connection for the fibre channel fabric switch controllers 3-1 to 3-M, switched from the spare disk drive units 4-*a* and 4-*b* to a healthy disk drive unit newly hot-swapped with a failed disk drive unit, to perform data copy/recovery independently of the access from the disk array controller 1-1 to 1-N to the disk drive group 10-1 to 10-L (see FIG. 4).

The present invention provides the connectivity of the plural disk drive units to a disk drive unit interface without compromising the transfer performance by using the fibre channel interface, which is a scheme of serial interface, and by applying a fibre channel fabric topology, which allows hot swapping of connectivity. The present invention further provides a solution of controlling the plural disk drive units with one or a few disk drive unit controllers, by hot-swapping the connectivity for each controller and disk drive group. In addition, the present invention provides improved reliability of the system by performing the operation of data recovery in case of disk drive unit failure, independently of the data transfer between the disk drive interface controllers and the disk drive units.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A storage system internally comprising:

a plurality of disk drives corresponding to a plurality of fibre channel interface paths;

a controller to be coupled to a network for controlling data transfer from/to a computer external of said storage system coupled to said network and controlling at least write and read requests of said disk drives;

a network interface, included in said controller, for transferring data from/to said computer external of said storage system via said network;

a disk drive interface, included in said controller, for transferring data sent from said computer external of said storage system to said disk drives and transferring data to be sent to said computer external of said storage system from said disk drives;

a switch coupled to said disk drive interface by at least one of first paths, wherein said switch is further coupled to said disk drives by said fibre channel interface paths, wherein the number of said at least one of first paths is less than the number of said fibre channel interface paths, wherein said plurality of disk drives store data sent from said computer external of said storage system through said disk drive interface and said switch and each of said plurality of disk drives has an identification (ID) number, and wherein said switch establishes a switch connection between said disk drive interface and said disk drives by said fibre channel interface paths, and transfers data to a selected disk drive among said plurality of disk drives by one of said fibre channel interface paths based on information of said ID number of the selected disk drive to which data is to be written upon receiving said data from said disk drive interface.

2. A storage system according to claim 1, wherein said switch receives said data and outputs said data to any at least two selected disk drives of said plurality of disk drives based on information of said ID numbers of said at least two selected disk drives for storing said data upon receiving said data from said controller which outputs said data through said disk drive interface.

3. A storage system according to claim 1, wherein said switch detects said information of said ID numbers of selected disk drives.

4. A storage system according to claim 1, wherein said switch maintains said information of said ID numbers allocated to at least two of said disk drives.

5. A storage system internally comprising:

a plurality of disk drives corresponding to a plurality of fibre channel interface paths, wherein said disk drives store data in response to a write request from a computer external of said storage system and said disk drives are allocated to identifier (ID) numbers respectively;

a controller which receives a write request sent from said computer external of said storage system via a network and controls said write request of said disk drives;

a network interface, included in said controller, for transferring data from/to said computer external of said storage system via said network; and a switch coupled to said controller by at least one of first paths, wherein said switch is further coupled to said disk drives by said fibre channel interface paths, wherein the number of said at least one of first paths is less than the number of said fibre channel interface paths;

wherein said switch enables to establish a switch connection between said controller and said plurality of disk drives by said fibre channel interface paths so that data sent from said computer external of said storage system is transferred from said controller to a selected disk drive among said disk drives by one of said fibre channel interface paths based on information of said ID number of the selected disk drive upon receiving said data to be transferred from said controller.

6. A storage system according to claim 5, wherein said switch receives said data and outputs said data to any at least two selected disk drives of said plurality of disk drives based on information of said ID numbers of said at least two selected disk drives for storing said output data upon receiving said data from said controller which outputs said data through a disk drive interface included in said controller.

7. A storage system according to claim 6, wherein said switch detects said information of said ID numbers of said at least two selected disk drives.

8. A storage system according to claim 7, wherein said switch maintains said information of said ID numbers allocated to said at least two selected disk drives.

9. A storage system internally comprising:

a plurality of disk drives corresponding to a plurality of fibre channel interface paths;

a controller, to be coupled to a network, for controlling data transfer from/to a computer external of said storage system coupled to said network and controlling at least write and read requests of said disk drives;

a network interface, included in said controller, for transferring data from/to said computer external of said storage system;

a disk drive interface included in said controller, for transferring data sent from said computer external of said storage system to said disk drives;

a switch coupled to said disk drive interface by at least one of first paths, wherein said switch is further coupled to said disk drives by said fibre channel interface paths, wherein the number of said at least one of first paths is less than the number of said fibre channel interface paths;

wherein said plurality of disk drives store data sent from said computer external of said storage system through said disk drive interface and said switch; and a plurality of disk groups configured of at least two of said disk drives which have identifier (ID) numbers respectively, wherein said switch stablishes a switch connection between said disk drive interface and said disk drives by said fibre channel interface paths, and transfers data to one of said disk drives accommodated in group having a selected disk drive among said plurality of disk drives by one of said fibre channel interface paths based on information related to a selected disk group accommodating the selected disk drive to which data is to be written upon receiving said data from said disk drive interface.

10. A storage system according to claim 9, wherein said switch detects said information of the selected disk group accommodating the selected disk drives.

11. A storage system according to claim 10, wherein said switch maintains information of said disk groups allocated to said disk drives.

12. A data storing method in a storage system comprising the steps of:

assigning ID numbers to a plurality of disk drives which store data in said storage system, said disk drives correspond to a plurality of fibre channel interface paths;

receiving, by a network interface, a write request sent from a computer external of said storage system via a network; and controlling, by a controller which includes said network interface, to perform said write request, wherein said controlling step comprises:

transferring data in response to said write request from said controller to a switch which is coupled to said disk drives by said fibre channel interface paths, and to said controller via at least one of first paths which number is less than the number of said fibre channel interface paths, receiving data transferred from said controller at said switch, transferring data from said switch to a selected disk drive among a plurality of disk drives by one of said fibre channel interface paths based on information of an ID number of the selected disk drive to which said data is to be stored upon receiving said data at said switch, and storing data transferred from said switch by said one of said fibre channel interface paths in the selected disk drives.

13. A data storing method according to claim 12, further comprising the step of:

dynamically selecting a disk drive among said plurality of disk drives based on said information of said ID number of said disk drive to which said data is to be stored upon said receiving data transferred from said controller.

14. A data storing method according to claim 12, further comprising the step of:

detecting said information of said ID numbers of said selected disk drives.

15. A data storing method according to claim 12, further comprising the step of:

storing information of said ID numbers of said selected disk drives among said plurality disk drives.

16. A data storing method in a storage system which receives data sent from a computer external of said storage system through a network and stores data from said computer external of said storage system via a switch in a plurality of disk drives, said data storing method comprising the steps of:

assigning ID numbers to said disk drives which store data in said storage system, said disk drives correspond to a plurality of fibre channel interface paths;

receiving, by a network interface included in a controller, data transferred from said computer external of said storage system via said network, said data to be written on said disk drives;

controlling, by said controller which includes said network interface to write said data transferred from said computer external of said storage system on said disk drives, wherein said controlling step comprises:

establishing a switch connection between said controller and said disk drives by coupling a switch to a disk drive interface, included in said controller, and said fibre channel interface paths which correspond to said disk drives, said switch being coupled to said disk drive interface by at least one of first paths, wherein the number of said fibre channel interface paths are more than the number of said at least one of first paths coupled between said disk drive interface and said switch, and transferring data to a selected disk drive among said plurality of disk drives by one of said fibre channel interface paths based on information relate to a selected disk group accommodating said selected disk drive to which said data is to be written upon receiving said data from said disk drive interface.

17. A data storing method according to claim 16, wherein said switch detects said information related to said disk group accommodating the selected disk drives.

18. A data storing method according to claim 16, wherein said switch maintains said information related to said disk group accommodating at least two of said disk drives.

* * * * *